(12) United States Patent
Grabowski et al.

(10) Patent No.: US 7,603,440 B1
(45) Date of Patent: Oct. 13, 2009

(54) SYSTEM AND METHOD FOR MANAGEMENT OF END USER COMPUTING DEVICES

(75) Inventors: Joseph D. Grabowski, Sanford, FL (US); Dhaval Patel, Lake Mary, FL (US); Thomas A. Sturgeon, Sorrento, FL (US)

(73) Assignee: Persystent Technology Corporation, Tampa, FL (US)

( * ) Notice: Subject to any disclaimer, the term of this patent is extended or adjusted under 35 U.S.C. 154(b) by 646 days.

(21) Appl. No.: 10/290,240

(22) Filed: Nov. 8, 2002

Related U.S. Application Data

(60) Provisional application No. 60/331,192, filed on Nov. 9, 2001.

(51) Int. Cl.
G06F 15/177 (2006.01)
G06F 9/44 (2006.01)
(52) U.S. Cl. .................... 709/220; 717/168
(58) Field of Classification Search ......... 709/220–224; 714/2–4, 15, 26, 38; 717/168–173
See application file for complete search history.

(56) References Cited

U.S. PATENT DOCUMENTS

| | | | |
|---|---|---|---|
| 5,564,054 A | 10/1996 | Bramnick et al. | |
| 5,704,031 A * | 12/1997 | Mikami et al. | 714/4 |
| 5,958,062 A * | 9/1999 | Komasaka et al. | 714/1 |
| 5,974,547 A * | 10/1999 | Klimenko | 713/2 |
| 6,151,674 A * | 11/2000 | Takatani | 713/2 |
| 6,175,917 B1 * | 1/2001 | Arrow et al. | 713/1 |
| 6,178,452 B1 * | 1/2001 | Miyamoto | 709/224 |
| 6,209,089 B1 * | 3/2001 | Selitrennikoff et al. | 713/2 |
| 6,230,285 B1 * | 5/2001 | Sadowsky et al. | 714/14 |
| 6,279,119 B1 * | 8/2001 | Bissett et al. | 714/12 |
| 6,298,445 B1 | 10/2001 | Shostack et al. | |
| 6,345,294 B1 * | 2/2002 | O'Toole et al. | 709/222 |
| 6,347,375 B1 * | 2/2002 | Reinert et al. | 726/24 |
| 6,397,349 B2 | 5/2002 | Higgins et al. | |
| 6,421,777 B1 * | 7/2002 | Pierre-Louis et al. | 713/2 |
| 6,463,528 B1 * | 10/2002 | Rajakarunanayake et al. | 713/1 |
| 6,466,972 B1 * | 10/2002 | Paul et al. | 709/222 |
| 6,490,677 B1 * | 12/2002 | Aguilar et al. | 713/1 |
| 6,529,966 B1 * | 3/2003 | Willman et al. | 710/10 |
| 6,625,754 B1 * | 9/2003 | Aguilar et al. | 714/15 |
| 6,658,571 B1 | 12/2003 | O'Brien et al. | |
| 6,751,658 B1 * | 6/2004 | Haun et al. | 709/222 |
| 6,763,457 B1 * | 7/2004 | Aguilar et al. | 713/2 |
| 6,880,110 B2 * | 4/2005 | Largman et al. | 714/38 |
| 6,931,523 B1 * | 8/2005 | Tomoson et al. | 713/100 |
| 6,934,881 B2 * | 8/2005 | Gold et al. | 714/15 |

(Continued)

FOREIGN PATENT DOCUMENTS

WO  WO 0054149 A2 * 9/2000

*Primary Examiner*—Yemane Mesfin
(74) *Attorney, Agent, or Firm*—Fish & Richardson PC

(57) ABSTRACT

A system and method is provided for the repair of operating system and application binary files and configuration data files at pre-operating system boot stage by comparing attributes of the files against a reference collection of such files stored on a server during each reboot or restart cycle while creating and restoring a collection of dynamic operating system binary files, configuration data files, file system structures and hardware system attributes unique to the configuration and use of the system on a server for subsequent pre-operating system repair operations.

10 Claims, 4 Drawing Sheets

U.S. PATENT DOCUMENTS 7,062,643 B2 * 6/2006 Miyajima ..................... 713/1
7,089,300 B1 * 8/2006 Birse et al. ................. 709/221
2002/0083156 A1 * 6/2002 Wysoczynski .............. 709/219

* cited by examiner

SYSTEM AND METHOD FOR MANAGEMENT OF END USER COMPUTING DEVICES

CROSS REFERENCE TO RELATED APPLICATION

This application claims the benefit of U.S. Provisional Patent Application No. 60/331,192, filed Nov. 9, 2001, which is incorporated by reference in its entirety.

BACKGROUND

1. Field of Invention

The present invention relates generally to systems and methods for providing improved maintenance of computing systems. More particularly, the present invention relates to a system and method for providing improved support and maintenance functions for end user computer systems.

2. Background of Invention

There are many tasks associated with managing a computer system. Such tasks are required regardless of whether the computer system is a network of interconnected computers or a standalone computing system. Moreover, such tasks are required regardless of whether the computer system includes equipment associated with remote and wireless applications.

One of these tasks relates to repairs of lost, damaged, or modified files, which render the computer system in a state where it cannot achieve its purpose in the context of the organization for which it exists. Such repairs often require the application of additional software, a knowledgeable technician, or even a group of technicians to work on the computer system. Repairs and maintenance consume valuable resources, including online time, office resources, and human resources.

Alternative means for implementing repairs on computer systems, other than allocating technicians to the repair system, are often difficult to implement, costly and potentially destructive to user data. Known support and maintenance systems do not take into account changes to the computer system since its initial installation, its last period of maintenance, or changes to the system due to user, network, or peripheral initiated events.

Moreover, known software-based techniques for providing maintenance and repairs typically require the target operating system to be functioning, which may be impossible if, as is often the case, the target operating system is not functioning. In that situation, effecting repairs is very difficult. Also, if the target operating system was running when a problem occurred, files or data that needed to be repaired or updated might be locked, thus preventing maintenance. Another problem occurs when the target operating system requires the use of non-optimized methods of network and storage access. This would slow activities related to deployment, update, and repair.

Accordingly, there is a need for a product to address both existing and emerging challenges in the management of end user computing devices. More specifically, there is a need for a system and method that restores (self-repairs) a computer system in the event of software failure due to user error, introduction of virus, system crash, or other problem. The product should provide dramatic improvements for IT managers in terms of cost reduction and user satisfaction while allowing them to apply their efforts to more strategic and value-added initiatives by minimizing support calls and stabilizing their environment.

SUMMARY OF THE INVENTION

The present invention provides a method that satisfies a need of many computer users to better manage their computing devices. A preferred embodiment of the invention is a method for managing end user computing devices. The method includes the following steps. First, a reference collection of files associated with an operating system of a client is created. Preferably, the reference collection of files includes application binary files and configuration data files. Second, the reference collection is stored on a server, which is in communication with the client. The reference collection may also be stored on a hidden cache of the client. Third, attributes of application binary files and configuration data files of the client are compared against the reference collection during a reboot cycle of the client. Fourth, stored instructions and files are ensured that they are capable of bringing the operating system of the client to a usable state.

DETAILED DESCRIPTION OF THE INVENTION

Figure 1:
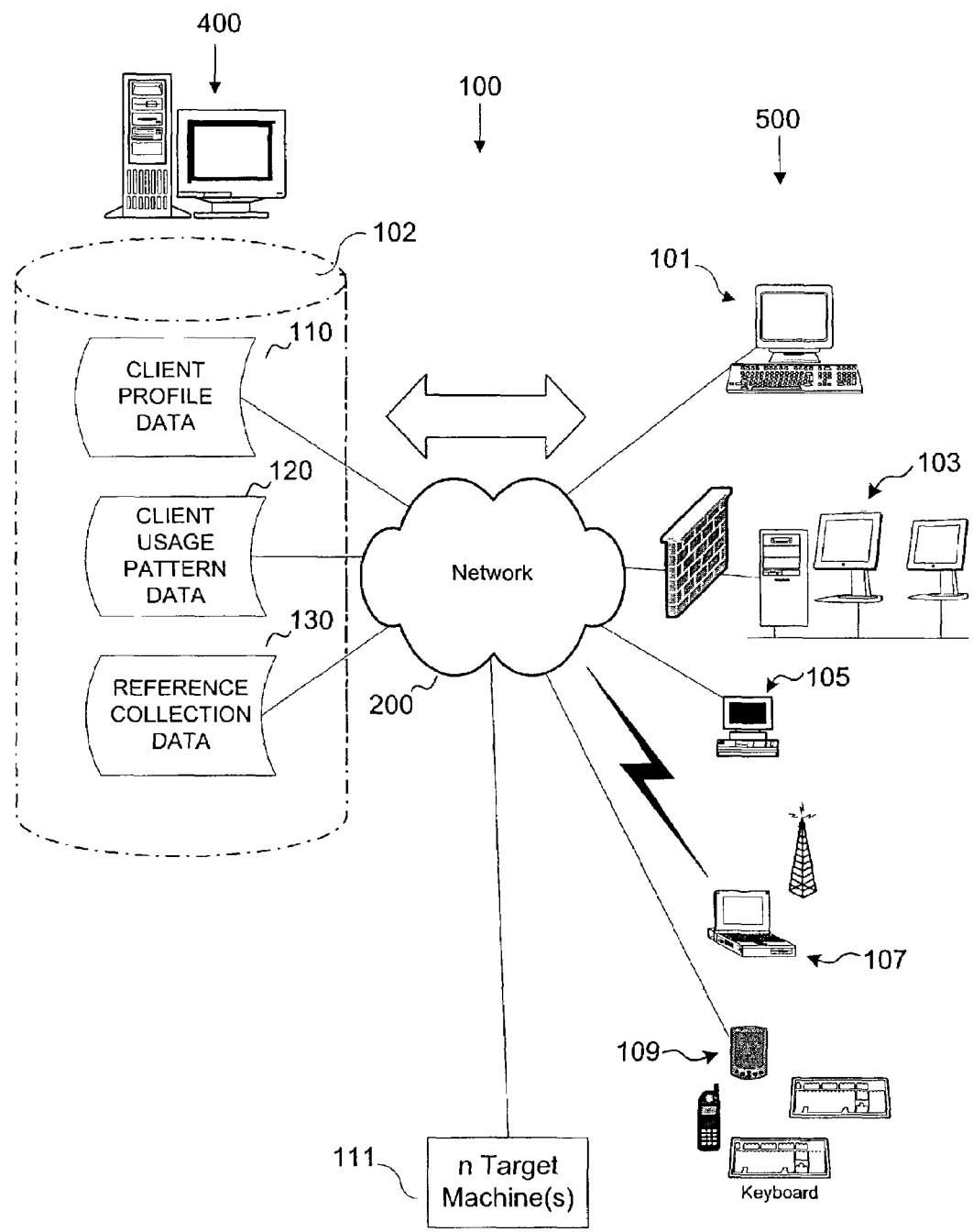
FIG. 1 is a schematic diagram showing an exemplary architecture of an embodiment of the invention.

Preferred embodiments of the invention is described below and schematically illustrated in the drawings. The description and drawings are only for the purpose of illustration and as an aid to understanding the invention. The description and drawings provided herein are not intended as a definition of the limits of the invention.

The preferred embodiment of the invention is an intelligent desktop management solution, which is hereinafter referred to as "IDMS"). IDMS provides a simple, transparent, and non-disruptive approach to user support.

IDMS delivers the following functions. First, IDMS recovers client computers which have crashed. The client computers could crash due to a number of reasons. For example, client computers could crash due to operating system failure, application crashes, or crashes due to viruses or hacking. To recover his system, all a user needs to do is reboot his computer. IDMS takes care of the repair and does it automatically and transparently. No other action on the part of the user or from technical support is required.

Second, IDMS works on networked computers (clients) that become standalone. For example, IDMS can work on notebook computers that are taken on business trips. When a networked client computer is not connected to a network and a problem is experienced, the auto-repair process does not require any type of network connection or access to any other system. All that is required is a reboot of the computer. IDMS provides the only known method that can resolve problems of this type without any involvement of the support line, technical support personnel, or the end-user (other than initiating a reboot on the device).

Third, IDMS helps quarantine and minimize damage from viruses and hacker attacks. IDMS provides an easy way for users to rapidly recover from viruses or damage from hacker attacks while enabling the organization to prevent broader impacts to shared computing resources. Common viruses that attack operating system and application files can be easily contained by simply asking users to reboot and immediately run their anti-virus software and/or delete the offending e-mail/file.

Fourth, IDMS provides advanced deployment of applications, operating systems and update capabilities over the network, from the server to the client. For example, a migration from Windows 2000 to Windows XP can be executed in fewer than 10 minutes. It is noted that IDMS deploys software in a way that it does not diminish the system's workings in the context of the organization, structure, or operating environment in which it exists. There are a number of existing products that can deploy an operating, but do so in a manner that ignores context and the ramifications of future maintenance and self-repairing. An architecture of IDMS enables network administrators to add incremental items to software images previously built and deployed to clients. This eliminates the need to create an entirely new image for each combination or permutation of the device's context (as is required by many competitor's deployment solutions).

IDMS accomplishes all of this by creating and maintaining a "persistent image" on the client device. The concept of a persistent image means that the computer is able to automatically repair itself and return to a stable operating environment after something disrupts, deletes or damages key files that control the essential functions that the user depends upon. A disruption often occurs due to user error. Sometimes it can result from addition of new software that causes conflicts with the pre-existing software. And, increasingly, the disruption can come from malicious actions by computer hackers and the effects of computer viruses. Having a persistent image means that a PC—or any other computer device—can be restored to normal operation immediately by simply powering off and back on. Every time the device boots, IDMS executes a pre-boot sequence that automatically repairs any damage that has occurred since the previous boot.

While IDMS is focused on providing auto-repair functionality as its core purpose, it also offers broader management capabilities. For instance, because it uses its own method for system imaging and software deployment, it eliminates the need for other products.

Moreover, IDMS offers important assistance in the security and disaster recovery arenas. IDMS ensures that no permanent harm is done when key system operations are temporarily disrupted, whether by natural disaster, hardware failure, software crashes, viruses, or hacker attacks.

IDMS has been successfully adapted to work on desktop and portable PCs running Windows 9x, NT4.0, Windows 2000, Windows XP, and Linux. In addition, IDMS can be adapted to work on a Windows CE version to support the Compaq iPAQ and other CE-based systems, including CE-based embedded systems.

IDMS provides two client product types. The first client product type is a Single O/S, which allows a user to manage one operating system or one image per client. The second client product type is a Multi-O/S, which allows up to four different operating systems or images per client. The Multi-O/S allows the user to switch from one operating system to another with a simple reboot. It also allows multiple images of the same O/S on one client where more than one person might use a single machine (e.g., schools or other training environments). This version is also a huge time-saver in a QA environment where technicians are testing software against several operating systems and require a stable image for each test.

During pre-boot, IDMS detects and self-repairs problem files or registry settings. This means that, by simply rebooting the PC, an end-user can automatically resolve O/S or application file corruption, thereby eliminating calls to the help-desk. To implement this capability, an IT administrator creates a "perfect image" of the O/S and application files to be automatically self-repaired and supported by IDMS. This image is then compressed with a reversible algorithm and a MD5 hash is generated for the entire compressed image. The image and associated checksum are then stored on both a server and in a local cache (hidden partition) on the local client disk drive. Each time the client device is rebooted, the automatic self-repair of files is done by comparing the hard disk content with the content of an image stored on the local cache partition (or the server), and then restoring only the files that need to be restored. Most importantly, the "perfect image" and the unique profile of the machine type automatically adapt over time to conditions unknown or unforeseen by the IT administrator, creating not only a self-repair capability, but a self-managing feature as well.

This is accomplished by comparing each file of the O/S and applications to the files in the "perfect image". If there is a corrupted file, a missing file or an entire set of missing files, those damaged or missing files are simply replaced as the system is loading. The result is that when systems become unstable, the users need only to reboot their PCs. This ensures that every time the PC is rebooted it has a healthy O/S and application set available so that the user can be productive. Often, a user won't even realize there was a problem because his system always reboots to a healthy environment.

IDMS has the following feature/function capabilities:

Enable Server-Based Image Multicasting by using mTFTP to push software images from the IDMS server to the workstation, reducing the demand on network bandwidth and eliminating visits to the desktop or other user device;

Compress image files by 50% on average to further reduce network traffic;

Streamline the deployment of operating systems, application updates, and user settings to desktop and mobile workforces;

Allow IT managers to remotely image any Windows workstation. The central console can also be used to quickly deploy whole application packages or specific PC changes such as registry changes or desktop settings;

Accelerate migration to Windows™ 2000 and Windows XP™;

Enable customized deployment of software or operating systems to a specific department or groups;

Allow three levels of O/S and application management and security;

Support multiple partitions, with up to four Operating Systems on the same unit;

Self-repair the most critical files—including NTDetect, NTLDR, and NT Registry settings, or any other corrupted system or application file;

Maintain user data and custom settings after an automatic self-repair operation;

Fully Support laptop users with intelligent capabilities while they are disconnected from the network; and Take full advantage of Intel's pre-boot execution environment (PXE) technology to further automate the deployment of O/S and application images.

A preferred IDMS server of has the following minimum requirements:

Pentium III (minimum) processor, 512 MB RAM (If more than 250 concurrent users, scale as appropriate);

Disk Storage requirements are based on the number of base images and packages;

Network Operating System Windows NT, Windows 2000 Server, or Linux; and

DHCP Server installed locally or on another server available on the network remotely.

A preferred IDMS client has the following minimum requirements:

Personal computer 300 MHz, 6 GB hard disk, 64 MB RAM;

PXE-enabled network adapter or PXE boot diskette; and

A DHCP server installed on the network is required.

In addition, IDMS is adapted to offer the following core features:

The IDMS management platform includes a virtual machine (VM) for executing compiled programs (i.e. scripts), a graphical interface to interact with the user, utilization of low-level hard disk access for imaging/restoring/auto-repairing/customizing operating systems and finally a network interface through the PXE boot-rom;

Management tasks can be performed either interactively (with GUI wizards, or by entering commands at the interactive prompt), or in scripts containing command line statements;

Powerful but easy-to-use programming language (e.g., Rembo-C, the syntax of which is similar to JavaScript and PHP);

Virtual machine (VM) executing Rembo-C compiled epodes (RBX), e.g., the Virtual Machine is multi-threaded, and supports structured exception handlers;

On-the-fly compiler to interactively compile Rembo-C statements into VM opcodes;

Hard-disk buffering engine (like smartdrive); and

Utilizes the capability of performing file operation on un-partitioned space on the local hard disk to store local copies of files and IDMS data sets transferred from the server, in order to speed-up subsequent accesses to the same file (This feature dramatically improves performance when restoring the same operating system disk image several times on the same computer. Leaving some un-partitioned space on the hard disk for the local cache partition is strongly recommended when IDMS is used to restore an operating system every day, or at every boot (OS failure prevention by preemptive OS restoration)).

Preferably, IDMS provides the following graphical interface features:

Hypertext-based graphical user interface, with a visual programming language-like event handlers for executing IDMS statements when an action is triggered by the user;

16 bits display (32768 colors) or 256 colors video mode, all standard VESA modes supported;

Pointing devices, including, but not limited to Serial, USB, PS/2 mice supported (including wheel mice);

All the graphical interface objects are mapped to abstract variables/objects or Document Object Model Constructs or interface element object hierarchy, so that any object on the screen can be modified interactively or in scripts; and 256 colors PCX image format support. A variety of graphics formats can be used to create display elements, including PCX, JPEG, PNG or future formats as available.

Preferably, IDMS offers the following file system features:

File-based support for FAT12, FAT16, BIGDOS, FAT32, EXT2FS, LINUXSWAP, NTFS (NT4.0) and NTFS (Win2K);

NTFS limitations (IDMS cannot decrypt files encrypted with Win2K encryption keys, and cannot access NTFS compressed files);

On the fly partitioning Rembo-C functions;

File-based functions (to read, write, copy, delete, rename, move files and directories);

Auto-repairing;

Guaranteed application availability on every desktop that proactively corrects file and configuration related issues before the end user knows there's a problem; and Repair of deleted files, overwritten DLL's, incorrect file versions, corrupted registries and more (Auto-repairing runs during pre-boot so even critical boot files are protected. Unlike similar auto-repairing technologies, IDMS replaces the necessary files, without overwriting the entire application or user data).

Preferably, IDMS offers the following OS deployment:

Utilization of Image Creation and Image restoration of operating system disk images (An image corresponds to a collection of files, with no requirement on the source used to build the image, i.e., a user can create an image containing 50% of NTFS files and 50% of FAT16 files);

Compressed partition images (Images can be browsed directly from the IDMS client);

Support for partition image size of 100 GB;

Utilization of Virtual images (A Virtual Image is an exact copy of a file system's structure, but without copying the files content. A user can remove a directory in a virtual image without actually removing the directory on the disk. Virtual images are useful for pruning unwanted files/directories on image creation, and for merging images together on restoration (e.g. to restore a base image+a software image));

Unlimited differential imaging (create a differential of images, and restore combinations of base+differential images);

File based cloning, allowing auto-repairing operations (Auto-repairing is done by comparing the hard-disk content with the content of an image stored on the server (or the local cache partition), and restore only the files that need to be restored. In auto-repairing mode, a NT workstation can be restored to a safe state in less than 10 seconds); and Unlimited post-configuration (The low-level file system access implemented in IDMS, combined with the Rembo-C programming language makes OS configuration very easy).

Preferably, IDMS offers the following OS Specific features:

Utilization of Low-level access to NT registry files (Windows NT4.0 & 2000) from IDMS (The Windows Registry is handled as a file system, thus making possible to create basic images and differential images of the registry as for hard disk images. This is a very useful feature for software deployment);

Compatible with Microsoft's System Preparation Tool (SysPrep);

SID (NT's system identifier) re-generation functions; and

Linux kernel boot module (like LILO), including support for large initial ram disk.

Preferably, IDMS offers the following network features:

Proprietary IP implementation, designed for performance, with UDP based proprietary protocols;

NETfs, unicast file transfer protocol used to transfer files from and to the IDMS server;

Utilization of MCAST, multicast file transfer protocol (server to clients), using adaptive timeouts and windows (about 5-10 times faster than MTFTP, a standard protocol for multicast file transfers) or any type of broadcast protocol;

The MCAST protocol does not require any kind of synchronization between the clients—soft synchronization (Therefore, no manual intervention is required to rollout hundreds of PCs if MCAST is combined with Wake-On Lan (power-on computers remotely));

The FAST protocol, unicast window-based protocol, used to send files to the server;

Communications between the server and the client are encrypted using strong encryption standards;

All protocols are failure-prone: they will reconnect to a server even if the server was restarted;

Backup servers are supported: the clients can switch to the backup server in the middle of a transfer if the primary IDMS server has failed;

Access to TCP services through a special tunneling mechanism;

SMTP support (send emails with IDMS); and

Complete (read and write) database access, using ODBC.

Preferably, IDMS offers the following miscellaneous features:

Remote Console: IDMS client display can be controlled from a remote location with an IDMS Remote Console application (Communications between the IDMS client and the Remote Console are compressed and encrypted);

Authentication: Windows NT, Unix (passwd), NIS/NIS+, and RADIUS (for any other server) authentication protocols are supported by IDMS to authenticate a user (e.g. to grant access to the computer based on the identity of the user);

Hardware detection: IDMS can detect ISA PnP and PCI devices, and provides full access to DMI (SMBIOS) and CMOS through Rembo-C functions; and CD-Rom and Floppy mode: IDMS can be started from a floppy disk or a CD-Rom in places where PXE remote-boot is not available (The CD-Rom image can be customized to contain specific partition images or IDMS scripts).

Preferably, during pre-boot, IDMS automatically restores the client's machine based on one of the following selectable lock down modes:

Mode 1—Full Lock-Down—Restore base image and incremental(s) but do not preserve user's desktop settings, data in My Documents, or any applications that are not installed with IDMS. Note: During the auto-heal process data located in private folders (i.e. c:\work) remains intact.

Mode 2—No Lock-Down—Restore base image and incremental(s) but preserve user's desktop settings, data in My Documents, and any applications that are not installed with IDMS.

Mode 3—Semi Lock-Down—Restore base image and incremental(s) but preserve user's desktop settings, data in My Documents and do not preserve any applications that are not installed with IDMS.

FIG. 1 is a schematic diagram showing an exemplary architecture of an embodiment of IDMS. System 100 of the invention includes server-resident components 102 and client-resident components 104 (see FIG. 2). As shown in FIG. 1, server-resident components 102, which resides at server 400, include client profile data 110, client usage pattern data 120, and reference collection data 130. Client-resident components 104 residing at client 500, which is one of clients 101, 103, 105, 107, 109, and 111, are illustrated in FIG. 2 and is discussed below.

Server 400 stores or indexes the storage of client profile data 110. Server 400 also includes client usage pattern data 120, which is coupled to each client profile data 110. Client usage pattern data 120 is also coupled to reference collection data 130. Via network 200, server 400 is in communication with one or more target machines 101, 103, 105, 107, 109, and nth target machine 111 (collectively client 500). Client 500 receives from or transmits to server 400 instructions and usage-pattern data. The instructions and usage-pattern data are exchanged according to the instructions given to client-resident components 104.

Client-resident components 104 include code in the native instruction set of server 400, which is loaded into a client machine's memory. The memory can be a physical memory, a paged memory on a secondary storage, or scripts interpreted into machine instructions by another client-resident component. Although only one server is depicted in FIG. 1, two or more servers may represent server 400.

Figure 2:
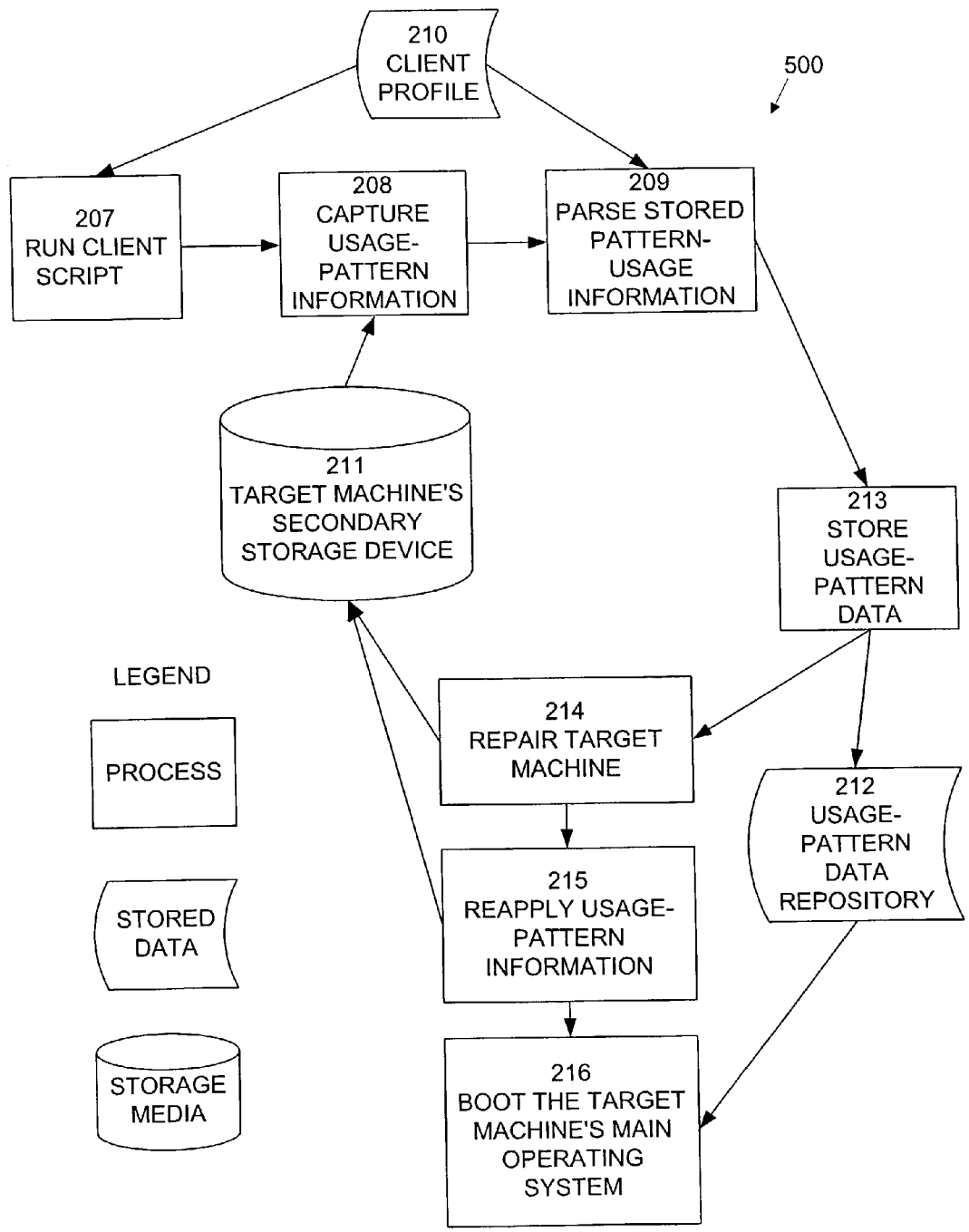
FIG. 2 is a schematic diagram showing an exemplary architecture of client-resident components of a system according to an embodiment of the invention.

FIG. 2 is a schematic diagram showing an exemplary architecture of client-resident components 104 of system 100. Examples of the sequence of client-resident components 104 are as follows: Upon each reboot or restart of client 500, a client script is transmitted from server 400 via network 200. The client script becomes run client script process 207 as a pre-boot program, where client profile data 110 is loaded from server 400 to direct the decisions and actions of run client script process 207.

Run client script process 207 initiates the capture of usage pattern information process 208, which references client profile data store 210. Run client script process 207 preferably captures usage-pattern data from a target machine's secondary storage device 211, or alternatively, other storage media.

Figure 3A:
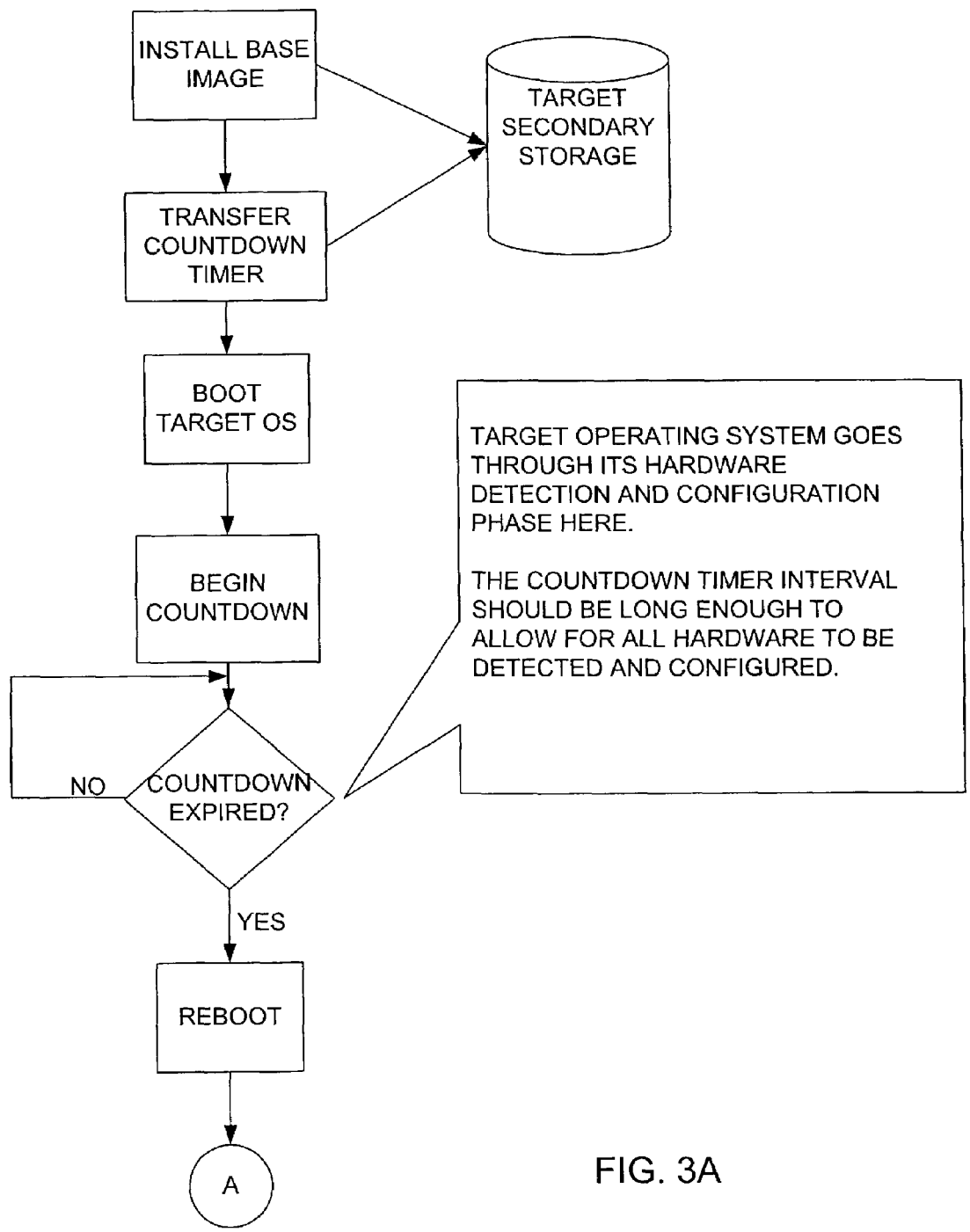
FIGS. 3A and 3B are collectively a schematic diagram showing examples of the capture of plug-and-play or hardware usage-pattern data using a hardware differential data countdown according to one embodiment of the invention.
Figure 3B:
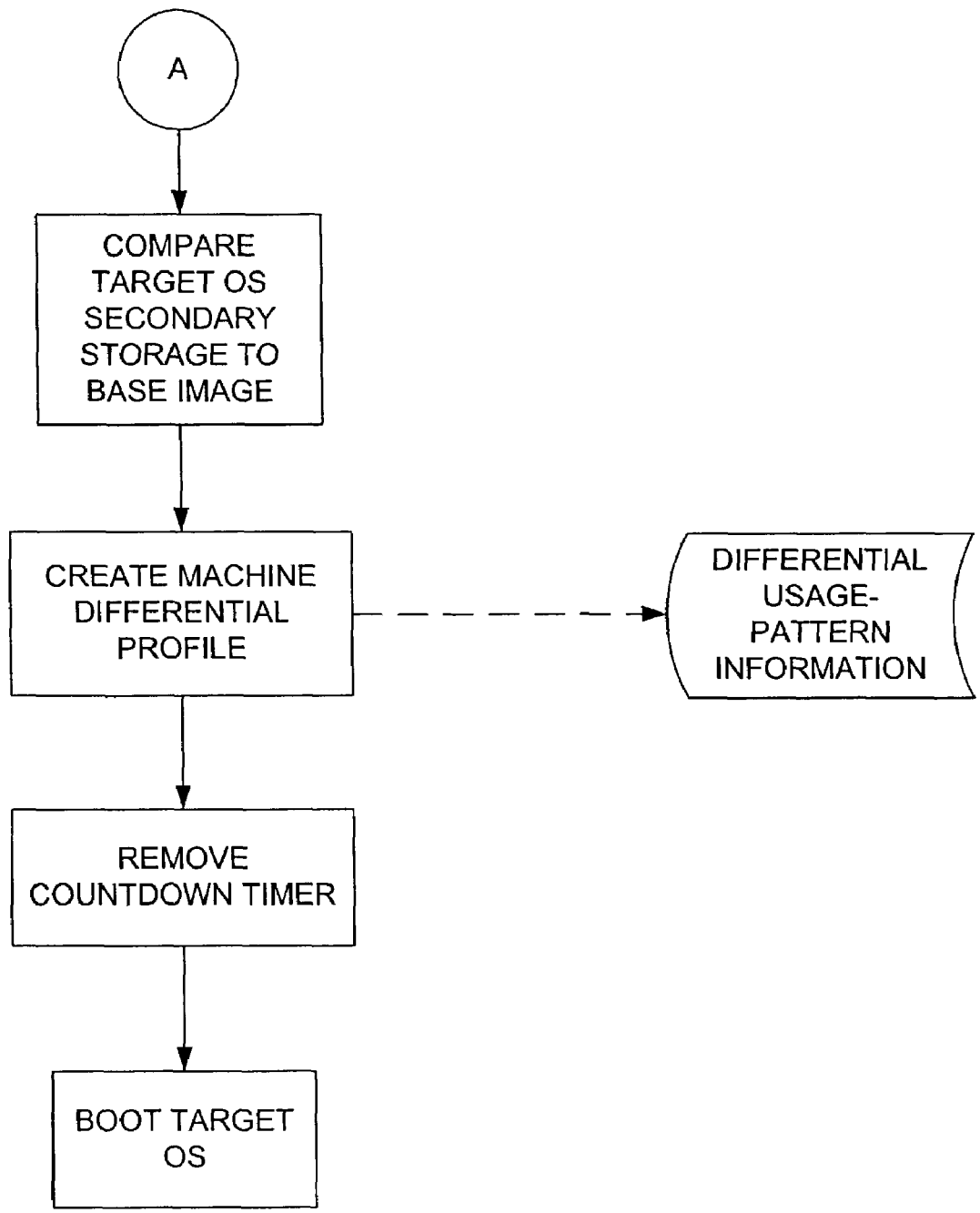

An exemplary embodiment for capturing usage-pattern data is illustrated in FIG. 3A and FIG. 3B. Usage data related to heterogeneous hardware is captured in process 208 using a hardware differential detection method, in which the client script 207 replaces the target operating systems shell with a program. The program then functions as a timer to run for a set period of time. When the timer expires, the program triggers a reboot or restart of the target operating system. In one embodiment, a timed interval allows the target operating system to run plug-and-play and hardware/software configuration routines for the individual target computer. After a reboot or restart, these changes are detected and stored as part of the target machine's unique profile on server 400 and/or a server surrogate (not shown) (such as a hidden cache of executable instructions and data on a target machine's hard drive).

Another example of capturing usage-pattern data related to heterogeneous hardware in process 208 uses a hardware differential detection method. Here, client script 207 replaces the target operating system shell with a program that runs after process 216. Client script 207 can be configured to function as the timeout. Alternatively, the program can do the following: (1) scan the operating system's process table and memory structures to detect, for example, the signatures associated with a running plug-and-play or hardware configuration process; (2) store the changes associated with the plug-and-play and hardware configuration process in a local or networked repository; and (3) reboot or restart the system once the process is complete.

The following is a representation of the code to substitute the countdown timer as the operating system shell, according to one embodiment of client script 207.

```
/****** invention/reboot
* NAME
* reboot.c -- Program to insert reboot or restart code into Windows
NT/2000
*
* INPUTS
*   None
* BUGS
*   None
******
*/
/****v* reboot /msgs
* NAME
*   msgs
* DESCRIPTION
*   Displays what is being done on the user desktop
* NOTES
*   None
******
*/
str msgs;
/****f* reboot/message
* NAME
*   message
* DESCRIPTION
*   Displays the messages on the user desktop
* SYNOPSIS
*   message(str msg)
* INPUTS
*   msg - a string which contains what is being done
* RETURN VALUE
*   None
******
*/
void messaqe(str msg){
    // Output a message to the user
printf("%s",msg);
}
/****f* reboot/ForceReboot
* NAME
*   ForceReboot or restart
* DESCRIPTION
*   Makes Computer reboot or restart again if it is w2k or win nt writes
shutdown.exe into registry
* SYNOPSIS
*   ForceReboot (void)
* INPUTS
*   None
* RETURN VALUE
*   None
******
*/
void ForceReboot (void){
    if(TestFile("c:/WINNT")){
        Copy("server//global/plugins/shutdown.exe","c:/");
        if(TestFile("c://WINNT/system32/config/SOFTWARE")){
            OpenHive ("_reg",
"c:/WINNT/system32/config/SOFTWARE");
            str msgs = "Creating Unicode File of shutdown.exe";
            message(msgs);
            WriteUniToReg("_reg/Microsoft/Windows
NT/CurrentVersion/Winlogon/Shell.unicode","c:\\shutdown.exe /R /T:60
\"Completing invention Operations\" /L");
            CloseHive ("_reg");
        }
        else {
//Halt on failure and issue a message
            CriticalError("Cannot open or modify the registry");
            for(;;){}
        )
    )
    else if(TestFile ("c:/WINDOWS")){
        if(TestFile("server//utilities/shutdown.exe")){
            Log("\nCopying shutdown.exe to the Win9x
workstation.\n");
            Copy ("server//utilities /shutdown.exe","c:/");
        }
        else {
            CriticalError("\nCannot find shutdown.exe file...Contact your
system administrator!\n");
            for(;;){}
        }
    }
}
/****f* reboot/ResetReboot
* NAME
*   ResetReboot
* DESCRIPTION
*   Removes shutdown.exe from registry registry
* SYNOPSIS
*   ResetReboot (void)
* INPUTS
*   None
* RETURN VALUE
*   None
******
*/
void ResetReboot (void) {
    if(TestFile("c:/WINNT")){
        if(TestFile("c:/shutdown.exe")){
            Delete("c:/shutdown.exe");
            if(TestFile("c:/WINNT/system32/config/SOFTWARE")){
                OpenHive("_reg",
"c:/WINNT/system32/config/SOFTWARE");
                WriteUniToReg("req://_reg/Microsoft/WindowS
NT/CurrentVersion/Winlogon/Shell.unicode","Explorer.exe");
CloseHive ("_reg");
            }
        }
        else if(TestFile("c:/WINDOWS")){
            Log("\nCleaning up all of IDMS files in Win9x \n");
            if(TestFile("c:/autoexec.bat")){
                Delete("c:/autoexec.bat");
            }
            if(TestFile("c:/invention.bat")){
                Delete("c:/invention.bat");
            }
            if(TestFile("c:/shutdown.exe")){
                Delete("c:/shutdown.exe");
            }
            Touch("c:/autoexec.bat","");
        }
    }
}
/*******/
```

Another example of the means for capturing usage-pattern data is by implementing the following pseudo-code [p-code] algorithm in process 208:

If the first time flag is TRUE, record the count of directories in the user profile by performing steps 1-4 below, then reboot or restart.

Step 1 Let Integer I=0 (I is a generic counter variable);

Step 2 Loop While the function to get the next directory does not return a value equivalent to the no more directories flag, incrementing I by 1 each iteration through the loop.

Step 3 Output I to the profile store for the client.

Step 4 Store the initial user profiles directory structure and configuration data to the server.

Reboot or restart

If the first time flag is FALSE, probe the target machine's user profile archive to detect if a new user has logged into the same machine and a new profile has been added.

Step 1 Let Count=f(x) where x is the retrieved value of the last count of directories Step 2 Let Integer I=0

Step 3 Loop While the function to get the next directory does not return a value equivalent to the no more directories flag, incrementing I by 1 each iteration through the loop.

Step 4 If Count is greater than I, re-archive the entire set of directories that store user profile information.

The following is a representation of the code used to implement a rule to detect new users of a system in process 208:

```
/****v* selfheal/user_count
* NAME
*    user_count
* DESCRIPTION
*    a counter which is used to determine how many users are there in
Documents and Settings Folder
* NOTES
*    if a change in this count is detected, the registry will be set for
recapture for mode 1 only
******
*/
int user_count;
[CODE ABRIDGED HERE]
/* If this is the first time after initial deployment, record the
baseline count of user directories */
        if(TestFile("c./Documents and Settings")) {
                dir = GetDirInfo("c:/Documents and Settings");
                int new_user_count = sizeof(dir);
                WriteKeyValue(new_user_count, "user_count", "host");
        }
        DelKeyValue("reboot", "host");
}
[CODE ABRIDGED HERE]
/* Compare the directory count each time to see if the recapture of data
is necessary */
if(os=="winnt") {
                if(TestFile("c:/Documents and Settings")) {
                        CObject dir = GetDirInfo("c:/Documents and
Settings");
                        int new_user_count = sizeof(dir);
                        if(user_count < new_user_count) {
                                recapture = true;
WriteKeyValue(new_user_count, "user_count", "host");
                        }
                }
}
```

Another method for capturing usage-pattern data related to heterogeneous hardware in process 208 can be embodied in a hardware differential detection method where the client script 207 replaces the target operating system shell with a program. This program runs concurrently and continuously with the target operating system, after process 216. The program can actually scan the operating system's process table and memory structures to detect the signatures associated with a running plug-and-play or hardware configuration process. If changes are detected, the program can store the changes associated with the plug-and-play and hardware configuration process in a local or networked repository. An example of such repositories includes the operating system vendor's database of configuration data. Once storage operations are complete, the program can trigger a reboot or restart or re-initialization of the system.

In another embodiment, usage-pattern data can be captured (to ensure that the system will be restored in a usable state consistent with its actual uses) when client script 207 replaces or extends the target operating system's shell to capture and restore the operating system's native emergency recovery data and stores this data in a local or networked repository.

In another embodiment, client script 207 replaces or extends the target operating system's shell or environment to include executable instructions. The instructions enable the capture and analysis in process 208 of, for example, a human interface device (e.g., keyboard, handwriting recognition device, voice-recognition device, a mouse or another pointing device) and video information. Then client script 207 can monitor, for example, user actions. In addition, client script 207 can capture signature data files that indicate the tasks and activities occurring on the system. The analysis can include detection of user activities and, preferably, automatically schedule the installation of tools to make user tasks more efficient.

In another embodiment, run client script process 207 can control process 208. The control can be done through a filter configuration file or database, indicating data or structures to be added, removed, or omitted from control during the usage-pattern data capture process 208.

Preferably, the usage-pattern data is passed from capture usage pattern information process 208 to parse stored usage-pattern information process 209, which analyzes, sorts and packages usage-pattern data for storage and/or sets flags or passes the data through a network of rules to generate a list of actions.

In one embodiment, parse stored usage-pattern information process 209 passes parsed usage-pattern data to store usage-pattern data process 213. For example, the size and configuration of the secondary storage device is stored upon the initial deployment of the target system, and then subsequently compared at each reboot or restart to detect a hard drive reconfiguration or malfunction. Parse usage pattern information 209 preferably includes functions that compare information from the target machine against previous trend information and against rules to distinguish data indicating significant events or changes to the target operating system.

Preferably, store usage-pattern data process 213 stores the parsed usage-pattern data in the usage-pattern data repository store 212. Store usage-pattern data process 213 also initiates repair target machine process 214.

Repair target machine process 214 reads and applies reference data from reference collection data store 130 (FIG. 1) to the target machine's secondary storage device 211, rendering the target machine's secondary storage device 211 to a known clean state without usage-pattern data.

Preferably, repair target machine process 214 then initiates reapply usage pattern information process 215. Reapply usage pattern information process 215 recalls usage-pattern data for the target machine from the usage-pattern data repository store 212, then applies the usage pattern to the target machine's secondary storage device 211, thus rendering the target machine's secondary storage device 211 to a state where all reference data and usage-pattern data on the target machine's secondary storage media 211 are ensured to be in a usable state which corresponds to the target machine's actual uses.

A specific example of how script 207 can control process 215 by reading client profile data 210 related to the use of configuration data that controls the repair or restoration applications through the use of a timeout function is described below. First, a hash is computed from the number of seconds since the Unix epoch (Jan. 1, 1970). The hash represents specific second or tick when an application is to be disabled and removed from the healing or repair function in process 215. During subsequent reboot or restarts or maintenance cycles, the hash is compared to the system time and triggered actions are taken. The specific actions taken may depend selection of modes and methods to restore usage-pattern data.

Examples of defined modes in the preferred embodiment can be defined according to this code comment section:

```
/****v* selfheal/mode
* NAME
*   preconfigured
* DESCRIPTION
*   mode that determines how is a machine to be restored
*   mode = 1 - backup DAS and Registry only if there is a new software
detected (lockdown)
*   mode = 2 - backup DAS and Registry every reboot or restart
*   mode = 3 - backup DAS every reboot or restart but registry only if
there is a new software detected
* NOTES
*   This value is read in from the file
*   DAS is an acronym for Documents and Settings
******
*/
```

Process 215 includes a selection of restoration modes for usage-pattern data. Such modes include a mode where all usage-pattern data is omitted and process 216 is activated without restoring usage-pattern data. In another mode, some usage-pattern data is reapplied and other data is omitted. In another mode, all usage-pattern data is reapplied during process 215, the mode being set by reading client profile data 210.

Another embodiment of process 215 includes a method of statistically sampling a selection of usage-pattern data as compared against target machine's secondary storage device 211 to ascertain a confidence interval (set by client profile 210) that the target machine's secondary storage device 211 is in a state consistent with its actual uses. This occurs without performing a one-to-one check of all tuples containing usage-pattern data checkpoints.

Another embodiment of process 215 includes a method of recording the time/date stamp of several passes of control to process 216. If greater than n control passes occur within a set time interval (both n and the interval provided by client profile 210), a signal is sent to the server 100 indicating abnormal operation or user action.

If all repair or maintenance activities are complete, reapply client information process 215 initiates a boot to the target machine's main operating system process 216, terminating all control and influence of the system from the target machine. In this way the target machine is rendered in a usable state that corresponds to its actual dynamic uses.

One embodiment of the invention is a method for the automated repair of static operating system, application binary files, and configuration data files at pre-operating system boot stage. The method includes the following steps. First, attributes of the files against a reference collection of such files accessible on a server are compared. The reference collection can be stored on the server in a hard drive or a data schema. The comparison can be performed during at least one reboot or restart cycle. Second, a collection of dynamic operating system binary files, configuration data files, file system structures, and hardware system attributes unique to the configuration and use of the system on the server are created and restored for subsequent pre-operating system repair operations. This ensures the system's stored instructions and files are capable of bringing the system to a usable state which corresponds to its normal (i.e., actual) uses.

Another embodiment of the invention provides a system that executes the method described above. The system includes an automatic client process component. The client process component is loaded dynamically from a server. This client process can be dependent or independent on the target operating system. The client process can be read from a network or from a local server emulation. The client process component is executable on one or more of the set of client computer systems. The client process component includes a process or set of processes for determining the state of the machine via execution script data from the system server component. The client process script also compares the state of the client against the known good state of the reference collection, detecting and storing usage pattern information data and structures and the merging of the known good state and the usage pattern information to render the client capable of bringing the system to the desired state.

In another embodiment, a system of the invention includes a component that provides a graphical user interface for use by the user to create the ideal reference collection of data. The component also monitors the client processes' automated actions and provides the user with configurable options to set the behavior of the system.

In another embodiment of the invention, the graphical user interface is replaced with a text interface. Alternatively, the graphical user interface may interact with the user through the use of natural language or speech processing or via changes in the physiological state of the user.

In another embodiment, a system of the invention includes a parser component. The parser component parse ASCII format, Unicode or encoded or raw Binary data structures representing captured reference collection information or usage pattern information stored as user profiles, filesystem folders or directories, text configuration files, configuration databases or registry data. Parsing activities include packing and unpacking data, compressing or decompressing data, decomposing data into smaller units, composing larger units of data, comparing the meaning, parameters or magnitude of the data, evaluating conditional relations between the data, aggregating data, or separating data. Parsing prepares the data for interpretation.

In another embodiment, a system of the invention includes a repository of the reference collection and usage pattern information as archives of files, filesystem structures, text configuration files, configuration databases or registry data.

In another embodiments, the invention provides methods for modifying the behavior of the system. For example, configuration data specific to system behavior can be modified.

Another embodiment of the invention provides a system that operates a DOS-compatible client system with one or more computers running either a non-DOS or DOS-based operating system or a system configured to receive boot instructions from sources including but not limited to, removable media, fixed media, virtual media, network sources or affixed in any other way by any other device.

In another embodiment, the present invention provides a system having a central processing unit and random access memory. The system includes a computer-usable medium having computer-readable code means embodied in the medium for software for the automated repair of static operating system and application binary files and configuration data files at pre-operating system boot or re-initialization stage. The central processing unit and the random access memory are used to compare attributes of the files against a reference collection. The reference collection includes such files stored on a server during each reboot or restart cycle while creating and restoring a collection of dynamic operating system binary files, configuration data files, file system structures and hardware system attributes unique to the configuration and use of the system. The files and attributes are stored on a server for subsequent pre-operating system repair or maintenance, operations ensuring the system's stored instructions and files are capable of bringing the system to a usable state which corresponds to its actual dynamic uses.

An embodiment of the invention includes means for causing a computer to establish communication to the server process and managing the creation, manipulation, storage and restoration of the collection of dynamic operating system binary files, configuration data files, file system structures and hardware system attributes unique to the configuration and use of the system on a server for subsequent pre-operating system repair operations ensuring the system's stored instructions and files are capable of bringing the system to a usable state which corresponds to its actual dynamic uses.

Another embodiment of the invention includes a computer-readable program code as a means for causing a computer to modify server and system configuration data to control the collection of dynamic operating system binary files, configuration data files, file system structures and hardware system attributes unique to the configuration and use of the system on a server for subsequent pre-operating system repair operations ensuring the system's stored instructions and files are capable of bringing the system to a usable state which corresponds to its actual dynamic uses.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for storing operating system files, application binary files, and configuration data files at a pre-operating system boot stage of a client comprising:
    transmitting a client script from a server to the client in response to a reboot of the client, the client script defining a pre-boot process that is executed at the pre-operating system boot stage of the client and performs on the client the operations of:
        in response to an initial configuration of the client device, initiating a timer that runs for a set time period selected to allow an operating system of the client to execute one or more hardware and software configuration routines for the client;
        rebooting the client device after expiration of the set time period;
        detecting changes from the initial configuration resulting from the execution of the hardware and software configuration routines on the client; and
        comparing a reference collection of files stored on a server against the operating system files, the application binary files, and the configuration data files of the client during each subsequent reboot cycle of the client, wherein the reference collection of files comprises an entire operating system, one or more application binary files, and one or more configuration data files;
    generating a second reference collection of files based on the detected changes and the comparison, the second reference collection of files comprising one or more of the operating system files, the application binary files, and the configuration files stored on the client that do not match the reference collection of files, and wherein the second reference collection of files corresponds to the actual dynamic uses of the client;
    storing the second reference collection of files on the server, whereby the second reference collection of files is configured to be used in a subsequent pre-operating boot stage of the client; and
    provide the client access to the reference collection of files and the second reference collection of files during a subsequent pre-operating boot stage for a repair of the client to usable state that corresponds to the actual dynamic uses of the client corresponding to the second reference collection of files.

2. The method of claim 1, wherein the operating system is configured to receive boot instructions from one or more of removable media, fixed media, virtual media, and network sources.

3. The method of claim 1, wherein the operating system is a DOS-based operating system.

4. The method of claim 1, wherein the operating system is a non-DOS-based operating system.

5. A computer system for storing operating system files, application binary files, and configuration data files at a pre-operating system boot stage of a client, comprising:
    a server having a hardware storage device storing a reference collection of files, the reference collection of files comprises an entire operating system, one or more application binary files, and one or more configuration data files, the hardware storage device also storing a client script, the client script defining a pre-boot process that is executed at the pre-operating system boot stage of the client, the server being configured to provide the client script to the client in response to a reboot of the client;
    wherein the pre-boot process causes performs on the client the operations of:
        in response to an initial configuration of the client device, initiating a timer that runs for a set time period selected to allow an operating system of the client to execute one or more hardware and software configuration routines for the client;
        rebooting the client device after expiration of the set time period;
        detecting changes from the initial configuration resulting from the execution of the hardware and software configuration routines on the client; and
        comparing the reference collection of files against attributes of operating system files, application binary files, and configuration data files of the client during subsequent reboots;
    wherein the hardware storage device also includes instructions that, when executed by the server, cause the server to:
        generate a second reference collection of files based on the detected changes and the comparison, the second reference collection of files comprising one or more of the operating system files, the application binary files, and the configuration files stored on the client that do not match the reference collection of files, and wherein the second reference collection of files corresponds to the actual dynamic uses of the client;

store the second reference collection of files on the hardware storage device of the server for use in a subsequent pre-operating boot stage of the client; and provide the client access to the reference collection of files and the second reference collection of files during a subsequent pre-operating boot stage for a repair of the client to usable state that corresponds to the actual dynamic uses of the client corresponding to the second reference collection of files.

6. The system of claim 5, wherein the client script is an automatic client process component.

7. The system of claim 5, further comprising a graphical user interface adapted for use by a user of the client.

8. The system of claim 7, wherein the graphical user interface is adapted to monitor automated actions.

9. The system of claim 7, wherein the graphical user interface is adapted to provide the user with configurable options to set a behavior of the system.

10. The system of claim 5, further comprising a parser component, wherein the parser component is adapted to parse ASCII format, Unicode or encoded or raw Binary data structures.

* * * * *

UNITED STATES PATENT AND TRADEMARK OFFICE
CERTIFICATE OF CORRECTION

| | | |
|---|---|---|
| PATENT NO. | : 7,603,440 B1 | Page 1 of 1 |
| APPLICATION NO. | : 10/290240 | |
| DATED | : October 13, 2009 | |
| INVENTOR(S) | : Grabowski et al. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by (646) days Delete the phrase "by 646 days" and insert -- by 1,281 days --

Signed and Sealed this

Seventeenth Day of August, 2010

David J. Kappos
*Director of the United States Patent and Trademark Office*